(12) United States Patent
Bonham

(10) Patent No.: US 6,831,219 B1
(45) Date of Patent: Dec. 14, 2004

(54) CHROMATIC MUSIC NOTATION SYSTEM

(75) Inventor: David C. Bonham, Salt Lake City, UT (US)

(73) Assignee: George E. Furgis, Salt Lake City, UT (US)

( * ) Notice: Subject to any disclaimer, the term of this patent is extended or adjusted under 35 U.S.C. 154(b) by 0 days.

(21) Appl. No.: 10/127,669

(22) Filed: Apr. 22, 2002

Related U.S. Application Data

(60) Provisional application No. 60/285,832, filed on Apr. 23, 2001.

(51) Int. Cl.$^7$ .............................................. G09B 15/00
(52) U.S. Cl. ...................................................... 84/483
(58) Field of Search ........................... 84/483.2, 470 R, 84/471 R–476, 477 R–483.1, 484

(56) References Cited

U.S. PATENT DOCUMENTS

| | | | | | |
|---|---|---|---|---|---|
| 3,974,733 | A | * | 8/1976 | Cournoyer | .................... 84/473 |
| 5,404,788 | A | * | 4/1995 | Frix | ......................... 84/423 R |
| 6,218,603 | B1 | * | 4/2001 | Coonce | .................... 84/485 R |
| 6,324,378 | B1 | * | 11/2001 | Schlossberg | ............ 434/307 R |
| 6,686,529 | B2 | * | 2/2004 | Kim | ......................... 84/464 R |

* cited by examiner

*Primary Examiner*—Kimberly Lockett
(74) *Attorney, Agent, or Firm*—TraskBritt, PC

(57) ABSTRACT

The harmonic structure of music is visually represented by establishing a correlation of each degree of the diatonic scale with a specified color and applying that correlation to a musical composition so that each note of the composition is represented by the respective color uniquely identified with its scale degree.

22 Claims, 1 Drawing Sheet

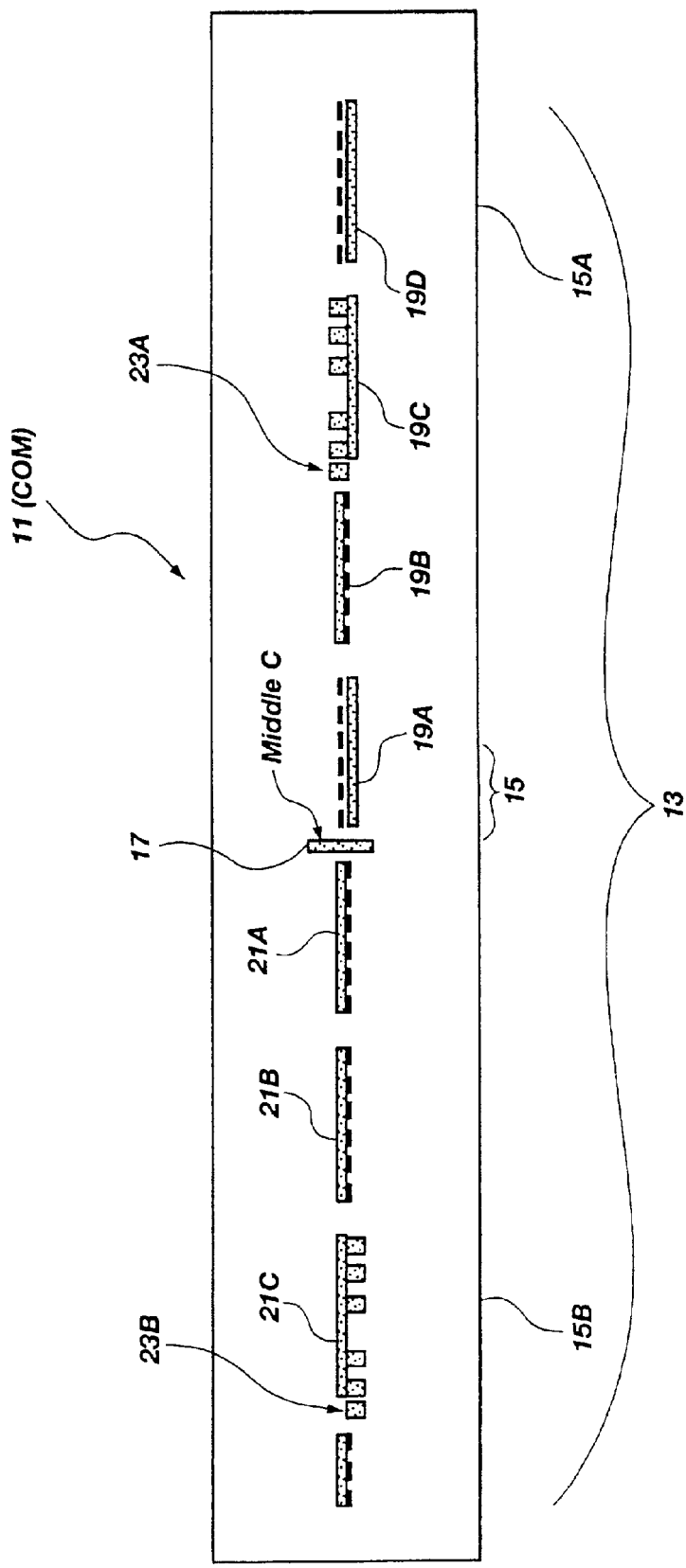

CHROMATIC MUSIC NOTATION SYSTEM

CROSS-REFERENCE TO RELATED APPLICATION

This application claims the priority of Provisional Patent Application Ser. No. 60/285,832, filed Apr. 23, 2001, for "CHROMATIC MUSIC NOTATION SYSTEM," the entire disclosure of which is incorporated by reference for its description of the theoretical basis for and practical implementation of the invention.

BACKGROUND OF THE INVENTION

1. Field of the Invention

This invention pertains to music notation and provides an a alternative system of notation based upon the correlation of colors to the tones of a musical scale.

2. State of the Art

Systems for the notation of western music have evolved over the past millennium, together with the concurrent evolution of music theory and the application of that theory to compositions and performances. For at least several centuries, the importance of harmonic structure has been recognized and taught.

Music notation is symbolic in nature, typically reflecting rhythm, melody and harmonic structure with reference to printed staffs. A staff comprises a plurality of parallel lines, each of which represents a specified pitch (selected audible frequency) within a musical scale (conventionally in the key of C major). The spaces between staff lines represent intermediate pitches within the same musical scale. The lines and spaces may be termed "staff positions" and are arranged to correspond to each whole tone and semitone (scale degree) of a musical scale. As the use of staffs became common, it became conventional practice to utilize vertical bar lines to divide them into measures of prescribed duration.

Historically, the appropriate pitch, rather than a specified scale degree, has sometimes been assigned to each line and space in a staff. According to this convention, the staff position corresponding to any given pitch remains constant. Players of transposing instruments (those pitched in keys other than C) are trained to use a different fingering to sound a designated pitch, in essence, performing the transposing function mentally. It requires less skill, however, and has thus became conventional practice to assign specific scale degrees to each staff position and to provide players of transposing instruments written music with individual notes transposed to the staff positions appropriate for the pitch of their respective instruments.

Because the audible range of music extends for several octaves, staffs representing different standardized frequency bands are in use, the most common being the treble, tenor and bass clef staffs.

The staff system may be regarded as a means for the graphical representation of music. Symbolic "notes" and "rests" divide each measure of the staff, indicating the duration of "struck" (or otherwise "sounded") tones and intervals of silence, respectively. Notes are positioned upon the staff to designate the scale degree (and thereby the pitch) of each note of a melody. Pitches outside the scale of the staff are designated by "accidental" symbols, indicating that the pitch corresponding to a scale degree should be either raised (sharped) or lowered (flatted), typically by a semitone. Traditionally, scale tones are assigned staff positions which correspond to the Key of C; that is, a C scale is represented without accidentals. Scales in keys other than C could be graphically represented by a staff which assigned pitches appropriate to that key to the staff. An alternative convention has been adopted, however. Specifically, the fundamental pitch of a staff is changed to keys other than C through the use of key signatures. In essence, the use of key signatures avoids the need for repetitive accidentals to graph compositions of varying keys on a common staff.

The graphical representation of harmony on a staff has also undergone evolution. Two-part harmony and counterpoint melodies could be written out as parallel melody lines. Harmonic accompaniment, however, was, until relatively recently, often improvised. An early method for indicating harmonic structure was the "figured bass" system. That system designated by numerals the harmonic scale positions of specific chords. Thus, the accompanyist could use the same graphical representation without regard to the key of the composition. Modem jazz notation still uses a form of figured bass notation, wherein scale positions are usually designated by roman numerals, and chord structures are designated by superscript Arabic numerals and letters.

Harmonic structure is susceptible to systematic analysis and application. Harmonic relationships, intervals, chord structures, progressions, scales, modes, and other theoretical topics have been studied and taught utilizing various organization approaches. Western music is conventionally based upon a "tempered" diatonic scale, that is, a scale in which an octave is divided into twelve evenly spaced semitones. The very nature of the diatonic scale imposes both a fundamental logic and a degree of complexity to the study and understanding of harmonic structure. The diatonic scale may be viewed as two tetra chords, specifically do-re-mi-fa and so-la-ti-do, separated by the whole step: fa-la. The construction of triads at each degree of a scale thus produces a non-repeating series of chords. Identifying each scale degree by a roman numeral, a minor interval as "m" and a major interval as "M," beginning students learn the following construction of triads:

| I   | do | Mm | (1st, 3rd, 5th)  |
|-----|----|----|------------------|
| II  | re | mM | (2nd, 4th, 6th)  |
| III | mi | mM | (3rd, 5th, 7th)  |
| IV  | fa | Mm | (4th, 6th, 8th)  |
| V   | so | Mm | (5th, 7th, 9th)  |
| VI  | la | mM | (6th, 8th, 10th) |
| VII | ti | mm | (Diminished)     |

The parenthetical arabic numerals in the table designate the scale tones of each triad, with "8th" being an octave higher than "1st." Each triad may be "inverted," that is, built up from any of its three individual notes. For example, triad VII (the diminished chord) may be built alternatively as 7th, 9th, 11th; 2nd, 4th, 7th or 4th, 7th, 9th. The student must thus learn to distinguish inverted triads from other chords which start from the same scale degree, but are spelled somewhat differently. For example, a If chord (2nd, 4th, 6th) must be differentiated from the inverted VII chord (2nd, 4th, 7th). This challenge increases with chords of greater complexity.

Music is generally written graphically, with individual notes assigned to staff positions, and the staff positions being assigned scale degrees corresponding to the key of C, augmented by key signatures. Chords are thus conventionally "spelled" by reference to the letter names designating the scale degrees of the key in which a composition is written (or transposed).

The spelling systems in use can be confusing, in that chords which are congruent (that is, spelled the same or containing the same notes) are given different names, depending upon the specific harmonic constraints of a composition. The discipline of music theory requires consistency within a selected key, inevitably requiring redundant nomenclature to describe the same chord in different environments. While many students of music gain a complete mastery of music theory, including harmonic structure, they do so with considerable effort and dedication. Even after devoting considerable effort to this study, many, including proficient performing musicians, fail to recognize the harmonic structure of musical compositions and are thus disadvantaged in their efforts to improvise. Others who are exposed to music theory simply find the subject matter inaccessible and/or incoherent.

Students of music are often instructed by reference to printed music which displays each note to be played, without reference to the harmonic structure of the composition. It is thus possible to progress in "sight reading" and other performance skills without gaining a good understanding or appreciation of harmonic structure. Many highly skilled performers thus lack the ability to improvise. Other performers improvise "by ear." While certain individuals achieve virtuosity by this means, an understanding of, or at least a "feeling" for, harmonic structure is generally regarded as essential for high-level improvised performance.

Color has been used as a guide to proper finger positioning in certain instructional systems for keyboard and fretted instruments. Colors have also been incorporated into devices and systems which display colors in response to pitches or other characteristics of audible musical signals. Heretofore, however, the color spectrum has not been correlated to harmonic structure for purposes of either performance or instruction.

SUMMARY OF THE INVENTION

This invention provides a musical notation system which correlates "rainbow" colors to the seven degrees of the diatonic major and minor scales. While other correlations are operable, the preferred notation system identifies the first through seventh degrees of Major and Minor Tonic scales, respectively, as: Red, Green, Violet, Yellow, Blue, Orange and Turquoise. The preferred correlation for the seven degrees of a relative minor scale are thus: Orange, Turquoise, Red, Green, Violet, Yellow and Blue, respectively. This correlation makes use of the conventional color wheel arrangement of primary and secondary colors. It assigns the primary colors (red, yellow and blue) to the scale notes conventionally regarded as most "important" (1st, 4th and 5th). The secondary colors (green, violet and orange) are assigned to the scale notes generally regarded as of secondary harmonic importance (2nd, 3rd and 6th). A tertiary color (e.g., turquoise or aqua) is assigned to the 7th scale tone, consistent with its generally recognized lesser status within the scale family.

It is recognized that the specific correspondence of the primary colors to the respective first, fourth and fifth scale notes can be selected from among any of the six possible arrangements. The specific correspondence of the secondary colors to the respective second, third and sixth scale notes can be similarly rearranged, although there is value in organizing the color sequence of the scale tones such that the middle note of each of the I, IV and V triads is the blended color of the colors representing the other two notes. Accordingly, while any tertiary color can be assigned to the seventh scale note without a serious consequence to the practical application of the invention, ideally that tertiary color will be the resultant of blending the colors representing the 5th and 9th (identical to the 2nd) scale notes. These considerations are reflected by the color sequence selected for purposes of this disclosure.

Various notation systems can be constructed upon this relationship of colors to sound. Among those notation systems is one designated the "Chromatic Music Notation" (CMN) system, which constitutes an exemplary embodiment of the invention. To avoid redundancy of description, this disclosure emphasizes the CMN system, but it is recognized that many equivalent alternative notation systems can be devised. The CMN system is one example of a notation system which correlates scale degrees to colors in a practical graphical manner. Compositions may be represented by CMN (or other color-coordinated notation systems) in a format suitable for sight-reading. Equally important, however, software can be utilized to convert conventional notation into CMN, suitable for display on a computer screen or printed out as a hard copy, for example. CMN data may be digitized and processed by conventional means for use with existing or evolving media devices and formats. Alternative software can adduce the harmonic structure of a composition from the audio signals of a recorded or live performance. CMN data, no matter how obtained, can be processed into a CMN video display, a CMN hard copy, a realtime or stored color display or any other realization corresponding to the harmonic structure of the composition. A student of music perceives the harmonic structure of the composition in terms of scale degree, without regard to the key in which it is written or performed.

The CMN system of this invention is based upon a perceived correlation between the color hierarchy of the visible light segment of the electromagnetic spectrum and the scale note hierarchy of any diatonic scale constructed within the audible sound segment of the electromagnetic spectrum. It is believed that analogous correlations inherently exist for natural scales and other scales which depart philosophically from the diatonic scale. Because modern musical instruction focuses on the diatonic scale, this invention finds more immediate application within that realm, and the CMN system is described as a currently preferred practical embodiment. The seven conventional rainbow colors are thus correlated with the seven tones of the diatonic scale, as follows:

| I | do | Red | Tonic |
| II | re | Green | Super Tonic |
| III | mi | Violet | Mediant |
| IV | fa | Yellow | Subdominant |
| V | so | Blue | Dominant |
| VI | la | Orange | Submediant |
| VII | ti | Turquoise | Leading Tone | so that the three primary colors (red, yellow and blue) are inherently associated with the three primary triads (those based upon the scale positions I, IV and V, respectively). By this means, many abstract aspects of music are visually displayed, making them more accessible to a large segment of the public. For example, adjacent scale tones (seconds) are inherently represented by complementary colors, and are thus readily seen to correspond to each other musically as dissonance. Thirds, which are heard as consonant intervals, are represented by a primary color and a secondary color comprising that primary color. For example, the third (I-III) interval is represented by red-violet (a blend of red and blue). The third (II-IV) is represented by green (a blend of yellow and blue) and yellow. The third (V-VII) is represented by blue and turquoise (a blend of blue and green). Sixth intervals, which are also perceived psychologically as consonant, follow a similar pattern, being represented by two colors, each of which either is or comprises a common primary color. For example, the sixth (I-VI) is represented by red-orange (a blend of red and yellow), while the sixth (II-VII) is represented by green (a blend of blue and yellow) and turquoise (a blend of blue and green). The degree of relatedness of the colors defining 2nd, 3rd and 6th intervals is useful in establishing "memory ties" for a student of harmony. The relationships of the colors (as adopted by the CMN system) representing all of the basic intervals starting at all scale positions are shown by the following table:

|     | 2nd | 3rd | 4th | 5th | 6th | 7th |
| --- | --- | --- | --- | --- | --- | --- |
| I   | R   | G   | V   | Y   | B   | O   | T |
| II  | G   | V   | Y   | B   | O   | T   | R |
| III | V   | Y   | B   | O   | T   | R   | G |
| IV  | Y   | B   | O   | T   | R   | G   | V |
| V   | B   | O   | T   | R   | G   | V   | Y |
| VI  | O   | T   | R   | G   | V   | Y   | B |
| VII | T   | R   | G   | V   | Y   | B   | O | in which:
R = red
G = green (blend of B and Y)
V = violet (blend of B and R)
Y = yellow
B = blue
O = orange (blend of R and Y)
T = turquoise (blend of B and G)

CMN may take various forms. Ideally, the root note of the harmonic domain is displayed in a visually dominant manner, such as by a larger image. Such a display offers the immediate identification of the harmonic changes in music and facilitates ear training in developing recognition of chord inversions. Similarly, it is often useful to display the tonic, dominant and subdominant scale notes proportionately larger than the other scale notes. By this means, the scale note hierarchy and relationships are emphasized in a manner believed to provide "memory ties" useful for ear training.

An appropriate display of the diatonic scale for purpose of harmony instruction is:

| | |
| --- | --- |
| Blue | Dominant |
| Orange | Submediant |
| Turquoise | Leading Tone |
| Red | Tonic |
| Green | Super Tonic |
| Violet | Mediant |
| Yellow | Subdominant |

This arrangement places the tonic scale tone at the center, which reflects its harmonic importance. The harmonic universe is bounded by the relatively significant dominant and subdominant scale tones, while the relatively less important scale tones are de-emphasized. It should be understood that the color names would ordinarily be represented by correspondingly colored symbols, and that those symbols could optionally be sized as suggested by the table. That is, the red tonic symbol could be relatively large, the blue dominant and yellow subdominant symbols of intermediate size and the remaining scale note symbols relatively small. The mental image arising from this graphic display is believed to better represent the scale from a harmonic perspective, although displaying scale notes in sequence, starting with the tonic, is appropriate to illustrate the manner in which scales are played.

In practice, musical compositions may be displayed in formats which preserve some aspects of conventional notation, while relying upon the color correlations of this invention merely to display harmonic structures of the cm position may be displayed in conventional fashion within measure bars, while the melody line is indicated by colored symbols. Alternatively, the composition may be displayed dynamically upon a display such that tempo is directly indicated by the pace of the display. Note duration and rests may be indicated directly by the duration of the colored note symbols on the display. Dynamics may also be indicated by color intensity or other visually perceivable indicia. Each of these parameters, among others, may be adjustable through software or hardware devices in accordance with conventional electronic data processing technologies.

DESCRIPTION OF THE DRAWING

The drawing is an example of one music notation system of this invention, specifically adapted for use with keyboard instruments.

DESCRIPTION OF THE ILLUSTRATED EMBODIMENTS

The graphic display generally 11, illustrated might appear, for example, on the screen of a personal computer. The display 11 comprises an octave line, generally 13, within a two-part frame 15A and B (collectively referred to as "frame 15"). As shown, the octave line 13 includes a vertical bar 17, which is assigned a reference pitch, in this case middle C, because the display 11 is intended for keyboard use. Octaves of increasingly higher pitch extend to the right and are designated by individual octave bars 19A, B, C and D. Similarly, octaves' of increasingly lower pitch are designated by octave bars 21A, B and C extending to the left. The frame 15 is color coded to indicate the key signature of the composition. The key of C would be indicated by a single color frame. The key of C sharp is indicated by displaying the frame segment 15A in red and the segment 15B in grey. The key of C flat would be indicated by reversing the colors of the segments 15A and B. The entire frame 15 may be caused to pulse with varying intensity to display the accents appropriate for the composition, and a metronome "click" or equivalent visual or audible signal may be generated as the musical notes 23A and B are displayed. The display 11 is specifically intended for keyboard use, so the notes 23A above the octave line 13 are intended to be played by the right hand, while those notes 23B below the octave line 13 are intended to be played with the left hand. As notes appear, they are played, and they are held until they disappear from the display 11. It should be noted that a composition would look exactly the same, without regard to the key in which it is played.

What is claimed is:

1. A method for representing the harmonic structure of music, comprising:
   establishing a correlation of each degree of the diatonic scale with a specified color; and
   applying said correlation to a musical composition so that each note of said composition is represented by a color uniquely identified with said note's scale degree within said musical composition.

2. A method according to claim 1, wherein said correlation is expressed as a visual display.

3. A method according to claim 1, wherein said correlation assigns primary colors to first, fourth and fifth scale degrees.

4. A method according to claim 3, wherein said correlation assigns red to the first scale degree, yellow to the fourth scale degree and blue to the fifth scale degree.

5. A method according to claim 3, wherein said correlation assigns secondary colors to second, third and sixth scale degrees.

6. A method according to claim 5, wherein said correlation assigns green to the second scale degree, violet to the third scale degree and orange to the sixth scale degree.

7. A method according to claim 3, wherein said correlation assigns a tertiary color to a seventh scale degree.

8. A method according to claim 7, wherein said correlation assigns turquoise to the seventh scale degree.

9. A method according to claim 1, wherein the color assigned to a third scale degree is a blend of the colors assigned to first and fifth scale degrees, the color assigned to a sixth scale degree is a blend of the colors assigned to fourth and first scale degrees and the color assigned to a seventh scale degree is a blend of the colors assigned to fifth and second scale degrees.

10. A method according to claim 9, wherein the colors assigned to the first through sixth scale degrees are, in sequence, red, green, violet, yellow, blue and orange.

11. A method according to claim 10, wherein the color assigned to the seventh scale degree is a blend of blue and green.

12. A method according to claim 1, further comprising:

applying said correlation to a said musical composition so that each said note of said composition is represented in a data base by a color uniquely identified with said note's scale degree within said composition; and processing said data base to obtain a visual representation of said composition in which said correlation is preserved.

13. A method according to claim 12, wherein said visual representation is dynamic.

14. A method according to claim 12, wherein said correlation assigns primary colors to first, fourth and fifth scale degrees.

15. A method according to claim 14, wherein said correlation assigns red to the first scale degree, yellow to the fourth scale degree and blue to the fifth scale degree.

16. A method according to claim 15, wherein said correlation assigns secondary colors to second, third and sixth scale degrees.

17. A method according to claim 16, wherein said correlation assigns green to the second scale degree, violet to the third scale degree and orange to the sixth scale degree.

18. A method according to claim 17, wherein said correlation assigns a tertiary color to a seventh scale degree.

19. A method according to claim 18, wherein said correlation assigns turquoise to the seventh scale degree.

20. A method according to claim 12, wherein the color assigned to a third scale degree is a blend of the colors assigned to first and fifth scale degrees, the color assigned to a sixth scale degree is a blend of the colors assigned to fourth and first scale degrees and the color assigned to a seventh scale degree is a blend of the colors assigned to fifth and second scale degrees.

21. A method according to claim 20, wherein the colors assigned to the first through sixth scale degrees are, in sequence, red, green, violet, yellow, blue and orange.

22. A method according to claim 21, wherein the color assigned to the seventh scale degree is a blend of blue and green.

* * * * *